US010463033B2

(12) United States Patent
Alfonso et al.

(10) Patent No.: US 10,463,033 B2
(45) Date of Patent: Nov. 5, 2019

(54) COMPUTER-IMPLEMENTED METHOD FOR SCORING FISH

(71) Applicant: HAYDEN EQUITIES INC., Winnipeg (CA)

(72) Inventors: Dean Alfonso, Winnipeg (CA); Kelly Cruise, Winnipeg (CA); Martin Petrak, Winnipeg (CA)

(73) Assignee: Hayden Equities Inc., Winnipeg, Manitoba (CA)

( * ) Notice: Subject to any disclaimer, the term of this patent is extended or adjusted under 35 U.S.C. 154(b) by 0 days.

(21) Appl. No.: 15/558,793

(22) PCT Filed: Mar. 18, 2016

(86) PCT No.: PCT/CA2016/050309
§ 371 (c)(1),
(2) Date: Sep. 15, 2017

(87) PCT Pub. No.: WO2016/145538
PCT Pub. Date: Sep. 22, 2016

(65) Prior Publication Data
US 2018/0070570 A1    Mar. 15, 2018

Related U.S. Application Data

(60) Provisional application No. 62/135,403, filed on Mar. 19, 2015.

(51) Int. Cl.
*A63F 13/00* (2014.01)
*A01K 97/00* (2006.01)
*H04W 4/029* (2018.01)
*G06T 7/62* (2017.01)

(52) U.S. Cl.
CPC ............. *A01K 97/00* (2013.01); *H04W 4/029* (2018.02); *G06T 7/62* (2017.01)

(58) Field of Classification Search
CPC ................................ H04W 4/02; A01K 97/00
See application file for complete search history.

(56) References Cited

U.S. PATENT DOCUMENTS

| | | | |
|---|---|---|---|
| 8,478,814 B2 * | 7/2013 | Shafter | G06Q 10/10 709/203 |
| 2012/0021837 A1 * | 1/2012 | Shafter | G06Q 10/10 463/42 |

* cited by examiner

*Primary Examiner* — David L Lewis
*Assistant Examiner* — Eric M Thomas
(74) *Attorney, Agent, or Firm* — Gowling WLG (Canada) LLP

(57) ABSTRACT

Computer-implemented methods use the location processor (e.g. GPS) of a networked mobile wireless telecommunication computing device such as a smartphone to determine the location where a fish was caught. This location is used to apply a species-specific and location-dependent formula to convert the length and/or weight of the fish into a point value so as to facilitate comparison of fish specimens across the locations in which they are caught.

25 Claims, 8 Drawing Sheets

US 10,463,033 B2

COMPUTER-IMPLEMENTED METHOD FOR SCORING FISH

TECHNICAL FIELD

The present disclosure relates to fishing, and more particularly to computer-implemented methods for scoring caught fish for comparison.

BACKGROUND

Fishing, both as a hobby and as a serious sport, is a popular activity. Anglers will often compete, whether in formal tournaments or informally such as between friends, to see who can catch the largest fish. The size of a fish can be measured by length, by weight, or by a combination of length and weight. However, even for the same species of fish, there may be regional variability in the weight/length ratios.

SUMMARY

Computer-implemented methods use the location processor (e.g. GPS) of a networked mobile wireless telecommunication computing device such as a smartphone to determine the location where a fish was caught. The catch location is used to apply a species-specific and location-dependent formula to convert the length of the fish to a point value so as to facilitate comparison of fish specimens across the locations in which they are caught.

Data processing systems for implementing the methods, and computer program products comprising tangible computer readable media embodying instructions for implementing the methods, are provided.

BRIEF DESCRIPTION OF THE DRAWINGS

These and other features will become more apparent from the following description in which reference is made to the appended drawings wherein.

DETAILED DESCRIPTION

Figure 1:
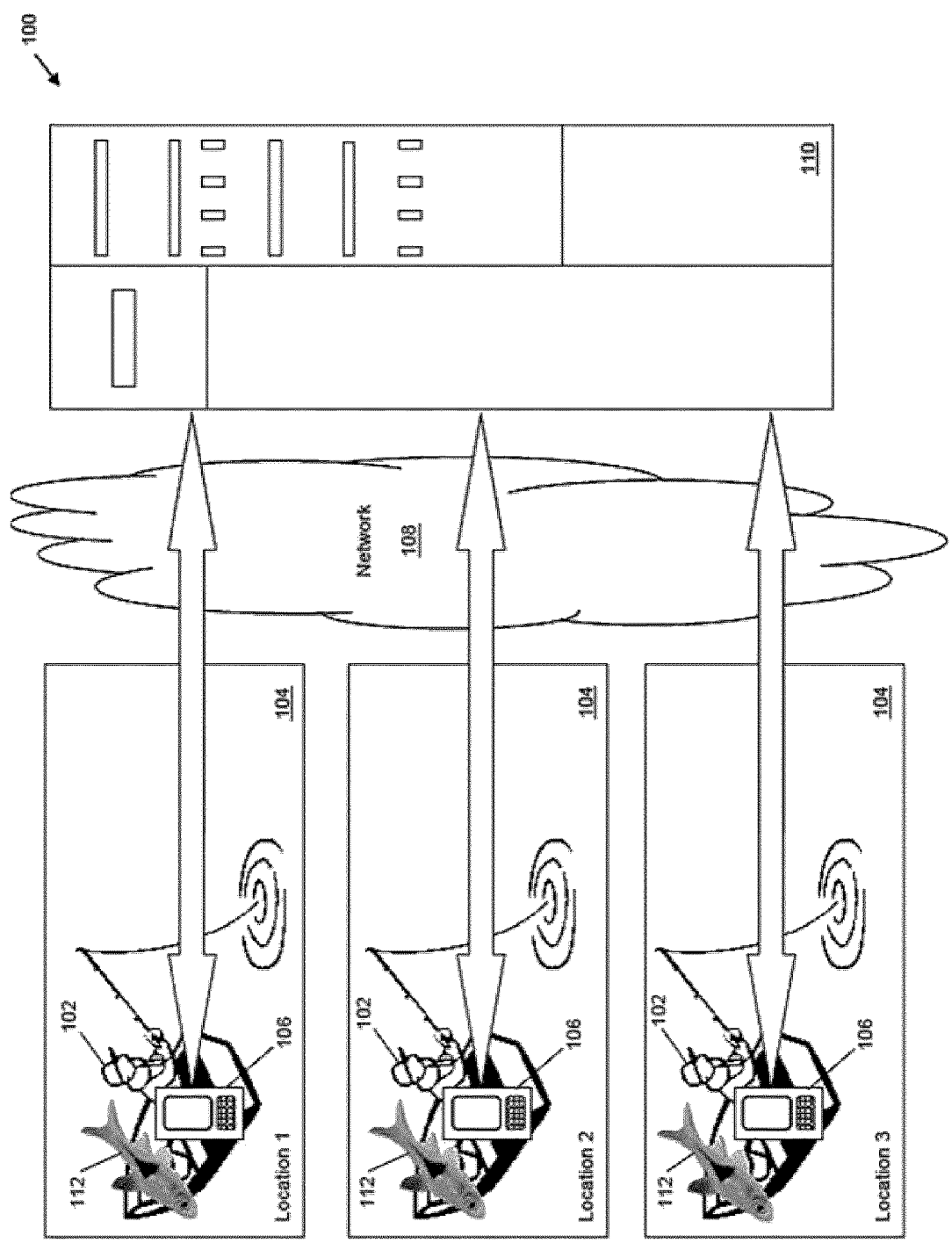
FIG. 1 shows schematically a plurality of anglers fishing in a plurality of different geographically dispersed locations, with the anglers each carrying smartphones that communicate with a data processing system that is geographically remote from the smartphones.

Reference is now made to FIG. 1, which shows schematically an exemplary arrangement, indicated generally by reference 100, in respect of which aspects of the present technology may be implemented. A plurality of anglers 102 are fishing in a plurality of different geographically dispersed locations 104, denoted as "Location 1", "Location 2" and "Location 3". More particularly, in the schematic illustration in FIG. 1, one angler 102 is in each location 104 for purposes of illustration; it is to be appreciated that multiple anglers may be in a single location. Delineation of regions of the Earth into "locations" is described in greater detail below. Each of the anglers 102 carries, either on his or her person or nearby such as in the boat or on the dock, a networked mobile wireless telecommunication computing device 106 equipped with a location processor and an imaging system, as described further below. In the exemplary embodiment, the networked mobile wireless telecommunication computing devices 106 are smartphones 106 although other types of networked mobile wireless telecommunication computing devices, such as tablet computers, may also be used. The smartphones 106 communicate via a network 108, such as the Internet, with a data processing system 110 that is geographically remote from the anglers 102, and hence from the smartphones 106 that the anglers 102 carry. Although shown as a single computer for ease of illustration, one skilled in the art will appreciate that the data processing system 110 may comprise a plurality of computers, either co-located or geographically dispersed, operating together, typically configured to function as a server. Each of the anglers 102 has caught a fish 112. The arrangement 100 shown in FIG. 1 enables a number of computer-implemented methods for scoring fish for comparative ranking which takes into account the regional variations in fish size.

Figure 2:
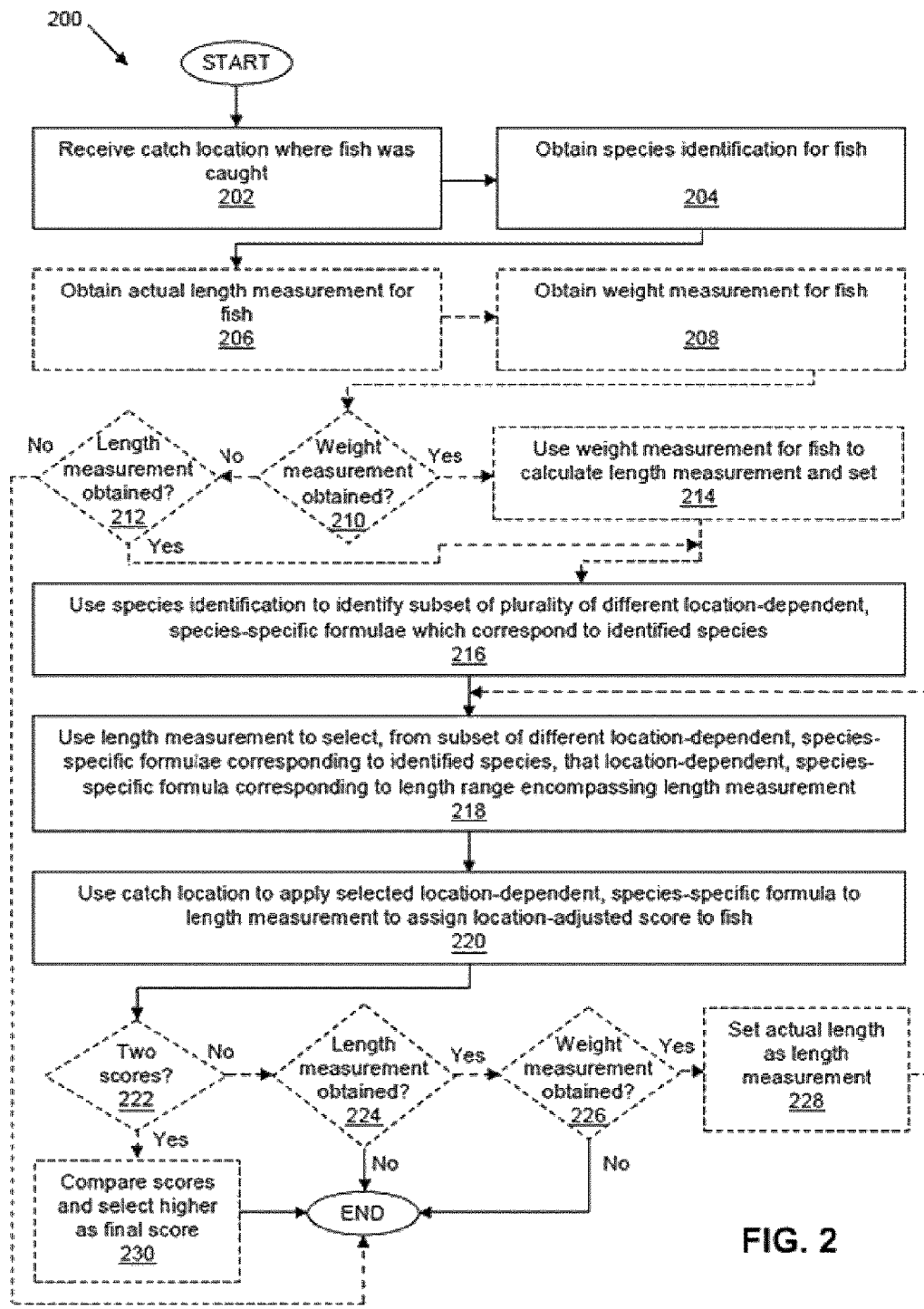
FIG. 2 is a flow chart showing a first exemplary computer-implemented method for scoring fish for comparative ranking.

Reference is now made to FIG. 2, which is a flow chart showing a first exemplary computer-implemented method 200 for scoring fish for comparative ranking. The method 200 is carried out by the data processing system 110, using information received from the networked mobile wireless telecommunication computing devices 106.

The method 200 may be carried out for each of the anglers 102, for each of the fish 112 that they catch. At step 202, the data processing system 110 receives a catch location (i.e. location 104) where a particular fish 112 was caught. The notional organization of physical regions of the Earth into different conceptual "locations" for purposes of identifying catch locations where fish 112 were caught may be carried out according to any suitable scheme. For example, larger political subdivisions such as states or provinces may be used, or smaller political subdivisions such as cities or counties may be used. Alternatively, organization of physical regions of the Earth into conceptual locations may be based on geographic features. In a presently preferred embodiment, it is considered advantageous, at least for the United States and Canada, to use states and provinces, respectively, since much of the data used in implementing the method is organized according to these political subdivisions. Thus, in such an embodiment a "catch location" would be a state or a province.

Importantly, the catch locations received by the data processing system 110 at step 202 are determined by the location processors of the respective networked mobile wireless telecommunication computing devices, in this case the location processors of the smartphones 106. The location processors use Global Positioning System (GPS) data, or other positioning data such as cellular triangulation, to identify the current positions of the respective networked mobile wireless telecommunication computing devices 106 which, since they are carried by or nearby to the anglers 102, will approximate the position at which the fish 112 was caught. Thus, the position data from the location processor on the networked mobile wireless telecommunication computing device 106 provides the catch location. Use of the location processors on the networked mobile wireless telecommunication computing devices to determine the catch location is essential to the technology described herein because it inhibits falsification of the catch location, whether deliberate or accidental.

At step 204, the data processing system 110 obtains a species identification for the fish 112, at optional step 206 (shown with dashed lines) the data processing system 110 obtains an actual length measurement for the fish and at optional step 208 (shown with dashed lines) the data processing system obtains a weight measurement for the fish. The term "actual length measurement", as used herein, refers to a length measurement obtained by a direct assessment of the length of a fish, and is distinguished from a "calculated length measurement", which is calculated from a weight of a fish, as described further below. Both step 206 and step 208 are shown as optional because in some implementations of the method 200 both steps may be present while in other implementations of the method 200 either step 206 or step 208 may be omitted; the method 200 requires that at least one of step 206 or step 208 be carried out.

Steps 202, 204, 206 and 208 may be carried out in any order, or may be carried out substantially simultaneously. In one type of embodiment, the angler 102 can manually enter the species identification and length and/or weight measurement (e.g. by typing or from a drop-down menu) into the networked mobile wireless telecommunication computing device 106 for transmission to the data processing system 110, along with the position data from the location processor. Alternatively, the networked mobile wireless telecommunication computing device 106 may communicate with one or more peripheral devices used to obtain the actual length and/or weight measurement. For example a retractable measurement cable similar to that described in U.S. Pat. No. 6,222,449 may be used to obtain an actual length measurement, and an electronic scale may be used to obtain a weight measurement. Preferably, the angler 102 will use an imaging system (e.g. camera) on the networked mobile wireless telecommunication computing device 106 to capture an image of the fish 112 for transmission to the data processing system 110 for verification and record-keeping, among other purposes. Where the networked mobile wireless telecommunication computing device 106 is used to capture an image of the fish 112, the networked mobile wireless telecommunication computing device 106 may process the image to determine the species identification and/or the actual length measurement. Some approaches to determining an actual length measurement for a fish from a photograph of the fish that includes a reference object are described in U.S. Pat. No. 8,478,814. In the embodiments just described, the data processing system 110 obtains the actual length measurement from the networked mobile wireless telecommunication computing device 106.

In another type of embodiment, an image of the fish 112 captured by the networked mobile wireless telecommunication computing device 106 may be transmitted to the data processing system 110 along with the position information, and the image may be analyzed by the data processing system 110 to obtain the species identification and/or actual length measurement for the fish 112. Thus, the data processing system 110 may obtain an image of the fish 112 from the networked mobile wireless telecommunication computing device 106, and use the image of the fish 112 to obtain the actual length measurement and/or the species identification. The species identification and/or actual length measurement obtained by analyzing an image of the fish 112 can be used either as a substitute for transmission of such data from the networked mobile wireless telecommunication computing device 106 or to verify data entered by the angler 102. Either type of embodiment can be implemented by using a web page in a browser on the networked mobile wireless telecommunication computing device 106, or as a native application that interfaces directly with the operating system of the networked mobile wireless telecommunication computing device 106. Capture of the catch location by the networked mobile wireless telecommunication computing device 106 can be triggered by appropriate instructions, implemented either in browser-executable code in the web page or as part of the program code for the native application, in response to user input from the angler 102 indicating that the angler 102 wishes to submit a fish 112 for scoring.

The term "actual length measurement", as used herein, includes a human obtained visual measurement using a ruler, tape measure or similar device, electronic measurement including without limitation via a retractable measurement cable similar to that described in U.S. Pat. No. 6,222,449, as well as a length measurement determined from a photograph of the fish, for example as described in U.S. Pat. No. 8,478,814.

In some instances, an angler 102 and his or her networked mobile wireless telecommunication computing device 106 may be out of range of the cellular or other network(s) to which the networked mobile wireless telecommunication computing device 106 would ordinarily connect for data transmission. However, where the networked mobile wireless telecommunication computing device 106 is equipped with a GPS receiver, depending on the technology used as well as other factors, the location processor may still be able to determine a catch location. In such cases, the catch location, species identification, actual length measurement and weight measurement, along with any image(s) of the fish 112, may be time-stamped and stored for later transmission to the data processing system 110 when the networked mobile wireless telecommunication computing device 106 connects to a suitable network.

At steps 210 through 230, the data processing system 110 uses the catch location and the species identification for the fish 112 to apply a location-dependent, species-specific formula to a length measurement to assign a location-adjusted score to that fish 112. As will be explained further below, the length measurement may be an actual length measurement or a calculated length measurement that is calculated from the weight measurement for the fish; a method for calculating a calculated length measurement from a weight measurement is described below. Moreover, the data processing system 110 may assign a location-adjusted score to the fish 112 by applying an appropriate location-dependent, species-specific formula to each of a first length measurement calculated from the weight measurement for the fish and a second length measurement that is an actual length measurement for the fish. The term "length measurement", as used herein, encompasses both an "actual length measurement" for a fish and a "calculated length measurement" calculated from a weight of the fish.

The terms "first length measurement" and "second length measurement" are used to distinguish the length measurements from one another and do not imply any particular order of operation or calculation.

At step 210, the data processing system 110 checks whether a weight measurement for the fish was obtained at step 208. Responsive to a "yes" determination at step 210, the data processing system 110 proceeds to step 214 and uses the weight measurement to calculate a calculated length measurement and sets the current length measurement (to which the appropriate location-dependent, species specific formula will be applied) equal to the calculated length measurement. The data processing system 110 then proceeds to step 216 using the calculated length measurement. Responsive to a "no" determination at step 210, the data processing system 110 proceeds to step 212 to see if an actual length measurement was obtained. Responsive to a "yes" determination at step 212, the data processing system 110 sets the current length measurement to the actual length measurement and proceeds to step 216 using the actual length measurement. Thus, if both an actual length measurement and a weight measurement are obtained, or if only a weight measurement is obtained, the data processing system 100 will proceed to step 216 with the calculated length measurement calculated from the weight measurement. If only an actual length measurement is obtained, the data processing system 100 will proceed to step 216 with the actual length measurement. If neither an actual length measurement nor a weight measurement have been obtained, resulting in a "no" determination at both step 210 and step 212, the data processing system 110 ends the method 200, and may provide an error message.

In the exemplary illustrated embodiment, the data processing system 110 stores, or has access to, a plurality of different location-dependent, species-specific formulae, with each of the location-dependent, species-specific formulae corresponding to a respective length range. Because the formulae are species-specific, at step 216 the data processing system 110 uses the species identification obtained at step 204 to identify a subset of the plurality of different location-dependent, species-specific formulae which correspond to the identified species. Then, at step 218, the data processing system 110 uses the current length measurement to select, from the subset of different location-dependent, species-specific formulae corresponding to the identified species, the location-dependent, species-specific formula that corresponds to the length range that encompasses the current length measurement. Steps 216 and 218 may be performed in reverse order; the data processing system 110 may first identify a subset of the plurality of different location-dependent, species-specific formulae that corresponds to the length range that encompasses the current length measurement and then select, from that subset, the formula corresponding to the identified species. Finally, at step 220, the data processing system 110 uses the catch location to apply the selected location-dependent, species-specific formula to the current length measurement to assign a location-adjusted score to the fish 112. In the exemplary illustrated embodiment, step 220 is carried out by using the catch location to calculate, retrieve or otherwise determine one or more variables to be used in the formula selected at step 218. Importantly, the score assigned at step 220 is different from the actual length measurement obtained at step 206 and is also different from the calculated length measurement calculated from the weight measurement at step 214.

In another embodiment, instead of using the catch location to determine one or more variables to be used in the formula, there may be a plurality of location-specific, species-specific, length-range-specific formulae, each prepopulated with appropriate variable values. The data processing system 110 can then filter the formulae using the catch location received at step 202, the species identification obtained at step 204 and the current length measurement obtained at step 206 or 214, to obtain the appropriate location-specific, species-specific, length-range-specific formula. The filtering can be carried out in any sequence.

A more detailed discussion of exemplary formulae for assigning the score is provided below.

During the first iteration of steps 216, 218 and 220, the data processing system 110 uses the catch location and the species identification to apply a first location-dependent, species-specific formula to the first length measurement, which may be an actual length measurement or a calculated length measurement, to assign a first location-adjusted score to the fish. After completing the first iteration of steps 216, 218 and 220, the data processing system 110 proceeds to step 222 to check whether two scores have been calculated and recorded. Responsive to a "no" determination at step 222, indicating that only a single score has been calculated, the data processing system proceeds to step 224 to check if an actual length measurement was obtained. A "no" determination at step 224 means that only a weight measurement was obtained and steps 216 to 220 were applied to the calculated length measurement (calculated from the weight measurement) to obtain the first location-adjusted score. Since there is no actual length measurement from which a second location-adjusted score can be calculated, the data processing system 110 ends the method 200 and the first location-adjusted score (based on the calculated length measurement) will be used. A "yes" determination at step 224 indicates that an actual length measurement was obtained, and the data processing system 110 proceeds to step 226 to check whether a weight measurement was also obtained. A "no" determination at step 226 means that only an actual length measurement was obtained and that steps 216 to 220 were applied to the actual length measurement to obtain the first location-adjusted score; since there is no weight measurement from which a calculated length measurement can be obtained, responsive to a "no" determination at step 226, the data processing system 110 ends the method 200 and uses the first location-adjusted score (based on the actual length measurement).

A "yes" determination at step 226 indicates that both an actual length measurement and a weight measurement were obtained. Thus, in this implementation of the method 200, the first length measurement is a calculated length measurement calculated from a weight measurement for the fish, obtained at step 314, and the second length measurement, obtained at step 306, is an actual length measurement. Since the exemplary implementation of the method 200 is configured such that where a weight measurement is obtained, steps 216 to 220 are first applied to the calculated length measurement calculated from that weight measurement, a "yes" determination at step 226 means that a score has been calculated for the calculated length measurement but not for the actual length measurement. Therefore, responsive to a "yes" determination at step 226, the data processing system 110 proceeds to step 228 and sets the current length measurement (to which the appropriate location-dependent, species specific formula will be applied) equal to the actual length measurement. After step 228, the data processing system 110 returns to step 218. More particularly, although the data processing system 110 could equivalently return to step 216, since step 216, which uses the species identification obtained at step 204 to identify a subset of the plurality of the plurality of different location-dependent, species-specific formulae which correspond to the identified species, has already been performed and the species of fish is unchanged, in the illustrated embodiment, it is more efficient to return to step 218 than to repeat step 216. By executing the second iteration of steps 218 and 220, the data processing system 110 uses the catch location obtained at step 202 and the species identification obtained at step 204 to apply a second location-dependent, species-specific formula to the second length measurement to assign a second location-adjusted score to the fish. This second location-adjusted score is different from the actual length measurement obtained at step 206 and is also different from the calculated length measurement calculated from the weight measurement at step 214.

The first length measurement is not necessarily identical to the second length measurement. Accordingly, if the first length measurement and the second length measurement are in different length ranges, the first location-dependent, species-specific formula selected during the first iteration of step 218 and applied during the first iteration of step 220 will differ from the second location-dependent, species-specific formula selected during the second iteration of step 218 and applied during the second d iteration of step 220. If the first length measurement and the second length measurement are in the same length range, the first location-dependent, species-specific formula selected during the first iteration of step 218 and applied during the first iteration of step 220 and the second location-dependent, species-specific formula selected during the second iteration of step 218 and applied during the second d iteration of step 220 will be identical.

After completing the second iterations of steps 218 and 220, the data processing system 110 proceeds to step 222 to again check whether two scores have been calculated and recorded. This second execution of step 222 will generate a "yes" determination, after which the data processing system 110 proceeds to step 230. At step 230, the data processing system 110 compares the first location-adjusted score and the second location-adjusted score, that is, the score calculated from the calculated length measurement (calculated from the weight measurement) and the score calculated from the actual length measurement, and assigns the greater of the first location-adjusted score and the second location-adjusted score as a final score, after which the data processing system 110 ends the method 200.

As will be appreciated from the foregoing description, the method 200 enables calculation of a score where both an actual length measurement and a weight measurement are obtained, or where only an actual length measurement or only a weight measurement is obtained. The exemplary implementation of the method 200 is configured such that where both an actual length measurement and a weight measurement are obtained, the score based on the calculated length measurement (calculated from the weight measurement) is calculated first and the score based on the actual length measurement is calculated second. This is merely an exemplary implementation shown and described for illustrative purposes, and in equivalent alternative embodiments the score based on the actual length measurement may be calculated first and the score based on the calculated length measurement may be calculated second.

As noted above, step 206 and step 208 are shown as optional because in some implementations of the method 200 both steps may be present while in other implementations of the method 200 either step 206 or step 208 may be omitted; the method 200 requires that at least one of step 206 or step 208 be carried out. If either step 206 or 208 is omitted, steps 210, 212 and 222 to 228, also shown as optional steps in dashed lines, would also be omitted. Moreover, if step 208 were omitted, step 214 would be omitted as well.

Figure 3:
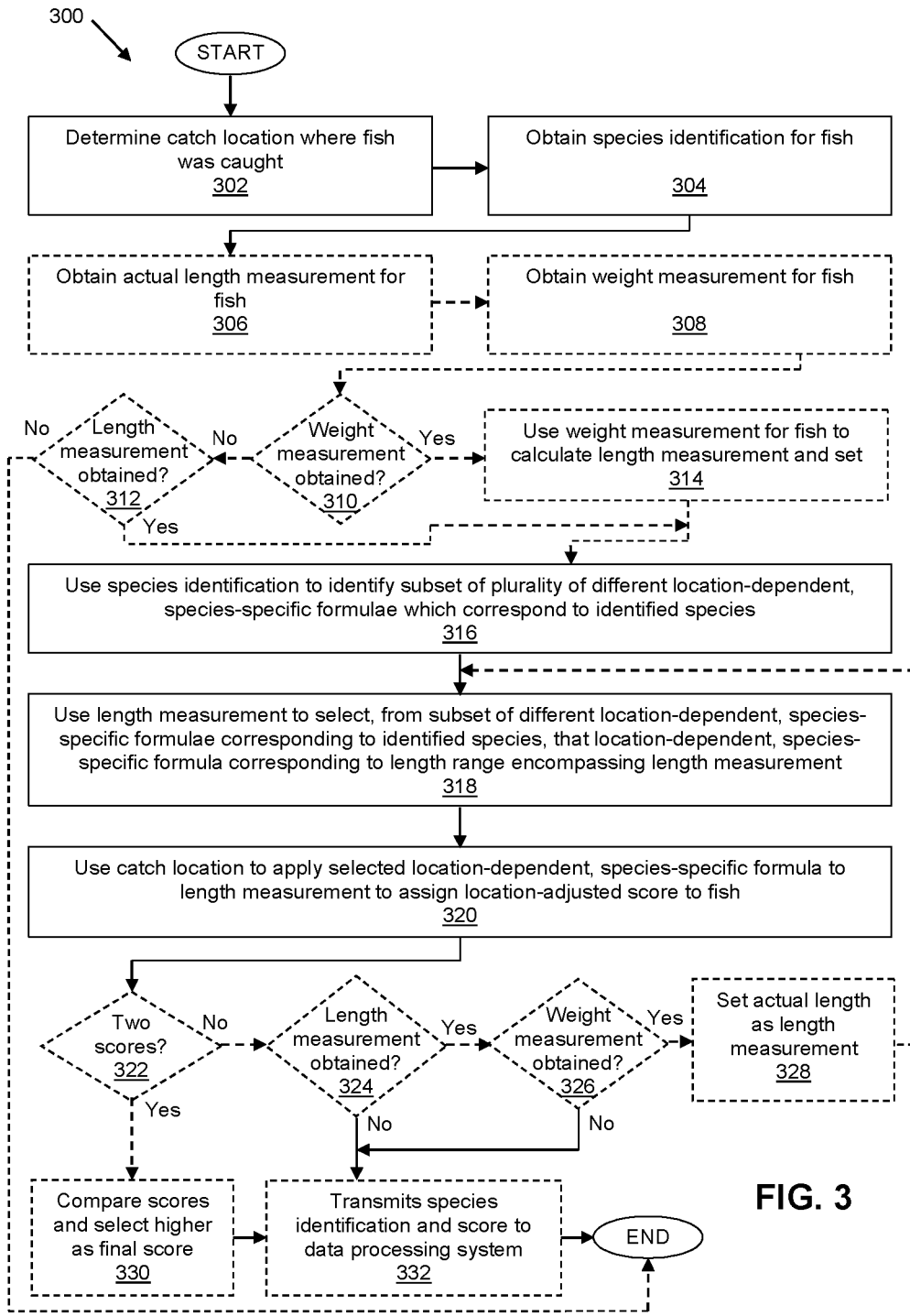
FIG. 3 is a flow chart showing a second exemplary computer-implemented method for scoring fish for comparative ranking.

Reference is now made to FIG. 3, which is a flow chart showing a second exemplary computer-implemented method 300 for scoring fish for comparative ranking. The second exemplary method 300 is carried out by the networked mobile wireless telecommunication computing device(s) 106 rather than by the data processing system 110, but is otherwise very similar to the first exemplary method 200. As such, like reference numerals denote corresponding steps, except with the prefix "3" instead of "2".

At step 302, the location processor of the networked mobile wireless telecommunication computing device 106 determines a catch location where the fish 112 was caught, and at steps 304, 306 and 308, the networked mobile wireless telecommunication computing device 106 obtains, respectively, a species identification for the fish 112, an actual length measurement for the fish 112 and a weight measurement for the fish 112. As with the first exemplary method 200, steps 302, 304, 306 and 308 may be performed in any order and either step 306 or 308, but not both, may be omitted.

In one embodiment, the angler 102 can manually enter the species identification and actual length measurement (e.g. by typing or from a drop-down menu) into a web page including suitable browser-executable code, or into a native application, on the networked mobile wireless telecommunication computing device 106. In another embodiment, the angler 102 may use an imaging system (e.g. camera) on the networked mobile wireless telecommunication computing device 106 to capture an image of the fish 112, with the image to be analyzed to obtain the species identification and actual length measurement for the fish 112. In such an embodiment, the image analysis may be carried out by the networked mobile wireless telecommunication computing device 106 or, if the processing demands are too intense, the networked mobile wireless telecommunication computing device 106 may transmit the image to the remote data processing system 110 for analysis and obtain the species identification and actual length measurement for the fish 112 from the remote data processing system 110. In the latter case, the networked mobile wireless telecommunication computing device 106 may optionally perform preprocessing of the image and transmit the preprocessed image to the data processing system 110 for analysis.

At steps 310 through 320, the networked mobile wireless telecommunication computing device 106 uses the catch location and the species identification for the fish 112 to apply a location-dependent, species-specific formula to a length measurement to assign a location-adjusted score to that fish 112, with the location-adjusted score being different from the length measurement. Steps 310 through 330 of the second exemplary method 300 are similar to steps 210 through 230 of the first exemplary method 200 and to avoid repetition are not discussed further. Moreover, in an alternate embodiment the networked mobile wireless telecommunication computing device 106 may use the catch location received at step 302, the species identification obtained at step 304 and the current length measurement obtained at step 306 or 314 to filter a plurality of pre-populated location-range-specific, species-specific, length-specific formulae, each pre-populated with appropriate variable values, to select the appropriate formula to be applied. In some embodiments, the networked mobile wireless telecommunication computing device 106 may not store the relevant formulae locally, but may use one or more of the catch location received at step 302, the species identification obtained at step 304 and the length measurement obtained at step 306 or 314 to retrieve the appropriate formula or a set of formulae from the data processing system 110.

At step 332, which takes place after step 324, 326 or 330, depending on whether only a weight measurement, only an actual length measurement, or both an actual length measurement and a weight measurement are obtained, the networked mobile wireless telecommunication computing device 106 transmits the species identification and the score to the data processing system 110. Optionally, the species identification may be transmitted at a different time than the score, for example before the score is determined. Even in a case where an image is not used to determine species identification or actual length measurement, the angler 102 will still typically use an imaging system (e.g. camera) on the networked mobile wireless telecommunication computing device 106 to capture an image of the fish 112, and this image will also be transmitted to the data processing system 110 for verification and/or record-keeping. Typically the actual length measurement and weight measurement obtained at steps 306 and 308 are also transmitted to the data processing system 110. Where the networked mobile wireless telecommunication computing device 106 is not in range of a suitable network when steps 302 to 332 are executed, transmission to the data processing system 112 can be delayed until the networked mobile wireless telecommunication computing device 106 connects to a suitable network.

Using either the first exemplary method 200 or the second exemplary method 300 (or their variations), the data processing system 110 can implement a remotely accessible database which allows the anglers 112 to (a) register the fish 112 and receive a score based on the species, location, and length measurement (either an actual length measurement or a calculated length measurement), (b) view fish scores based on location, species, time, and social network, (c) view fish caught in proximity of a given location, and (d) participate in social networking in the field of recreational fishing and fishing tournaments. Because the scores are location-adjusted scores, the scores will facilitate fair comparisons between fish caught in different locations. Importantly, the use of the location processor on the smartphone 106 (or other networked mobile wireless telecommunication computing device) enables the location to be verified.

As noted above, in both the first exemplary method 200 and the second exemplary method 300, the anglers 102 will preferably photograph or otherwise obtain an image of each captured fish 112 using their smartphone 106 in the location where the fish 112 was caught. In certain embodiments it may be made mandatory to transmit an image of the fish 112 from the networked mobile wireless telecommunication computing device 106 to the data processing system 110. The use of an image of the fish 112 supports further verification, even if not used directly to determine the actual length measurement. For example, the images can be reviewed to ensure that the submission is in fact a fish, to check for duplicate entries, and detect cases where a person may buy a fish from a fish market and transport it to a fishing location to enter it for points. In the latter case, the eyes of the fish in the photographs can be reviewed—if the fish has just been caught, the eyes will be bright and clear. The eyes will fade and become grey the longer the fish has been out of water. The images can also be checked for image tampering. Some approaches to detecting image tampering are described in U.S. Pat. No. 8,478,814. Optionally, where the operating system of the networked mobile wireless telecommunication computing device 106 can mark a captured image with location data, this location data can be used as, or compared to, the catch location for verification. In addition, the requirement for an image may assist in encouraging catch and release fishing.

As noted above, aspects of the present technology can be implemented by way of a native application that interfaces directly with the operating system of the networked mobile wireless telecommunication computing device 106. In a particularly preferred implementation of such an embodiment, the native application can be configured to launch upon applying a shaking action to the networked mobile wireless telecommunication computing device 106. This allows operation of the native application to be initiated by a one-handed gesture, which increases the convenience for an angler since one hand will typically be wet from handling the fish, etc. For example, the native application may be executing in the background, and the shaking gesture can be detected by an accelerometer/motion sensor on the networked mobile wireless telecommunication computing device 106 and used as a trigger to bring the native application into the foreground to occupy the screen of the networked mobile wireless telecommunication computing device 106. In one such embodiment, responsive to the shaking action, the native application will first initiate the interface to the imaging system (e.g. camera) on the networked mobile wireless telecommunication computing device 106 to enable the angler 102 to capture an image of the fish 112. This can then be followed by an image preview interface enabling the angler to review and approve, or recapture, the image of the fish 112. After the image of the fish 112 is approved, the native application can then present a suitable data entry interface.

Exemplary location-dependent, species-specific formulae for application to a length measurement to assign a location-adjusted score will now be described. The exemplary formulae described herein are applicable to public freshwater bodies of water in Canada and the United States for Bluegill, Crappie, Brook Trout, Brown Trout, Laketrout, Rainbow Trout, Striped Bass, Smallmouth Bass, Largemouth Bass, Northern Pike, Musky, Walleye, and Perch. One skilled in the art will, now informed by the herein disclosure, be able to extend the principles of the present disclosure to additional species of freshwater fish, including but not limited to Chain Pickerel, Flathead Catfish, Channel Catfish, White Bass, Hybrid Striped (Sunshine) Bass and Redear Sunfish, as well as to fish found in other locations in the world, including both freshwater and saltwater fish. Moreover, it is to be appreciated that some species may not be found in some locations.

Broadly speaking, the score is determined by converting the length measurement, which may be rounded (e.g. inches may be rounded to the nearest quarter inch) to a point value, utilizing a species-specific and location-dependent length-to-points conversion. In the exemplary embodiment described below, the score will be in a range from zero to 1250 points (with a score above 1250 being possible for a record-breaking fish). This 1250 point range is merely exemplary, and is not intended to be limiting; other point ranges may also be used. For example, in applications involving larger fish, such as found in saltwater, a range from zero to 100,000 may be used.

The following species-specific length/weight relationship, developed by fisheries professors and biologists in the United States to model "normal" species growth, were used as a basis for developing the exemplary formulae:

$$\text{Weight} = \frac{\text{length}^Z}{10^a}$$

where weight is in pounds and length is in inches. (For further information see Murphy et al., "The Relative Weight Index in Fisheries Management: Status and Needs", *Fisheries*, Vol. 16, No. 2, March-April 1991.)

For the equation above, the "a" and "$Z$" values for Bluegill, Crappie, Brook Trout, Brown Trout, Laketrout, Rainbow Trout, Striped Bass, Smallmouth Bass, Largemouth Bass, Northern Pike, Musky, Catfish, Walleye, and Perch are set out in the Table 1.

TABLE 1

| Fish Species | a | $Z_{normal}$ |
| --- | --- | --- |
| Bluegill | 3.371 | 3.316 |
| Crappie | 3.576 | 3.345 |
| Brook Trout | 3.366 | 2.960 |
| Brown Trout | 3.366 | 2.960 |
| Lake Trout | 3.778 | 3.246 |
| Rainbow Trout | 3.432 | 3.024 |
| Striped Bass | 3.358 | 3.007 |
| Smallmouth Bass | 3.491 | 3.200 |
| Largemouth Bass | 3.587 | 3.273 |
| Pike | 3.745 | 3.096 |
| Musky | 4.052 | 3.325 |
| Catfish | 3.829 | 3.294 |
| Walleye | 3.642 | 3.180 |
| Perch | 3.506 | 3.230 |

Figure 4:
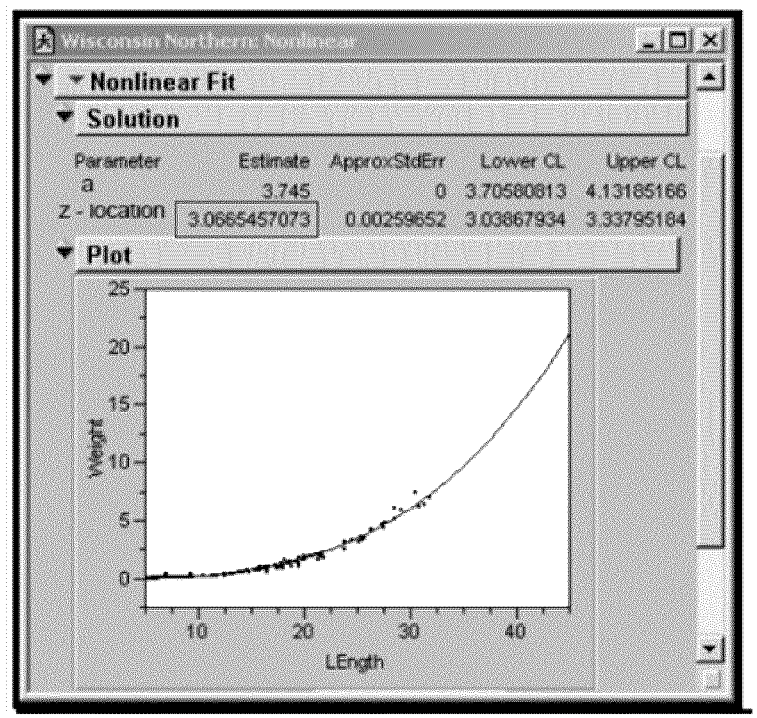
FIG. 4 shows an exemplary plot solved for "$Z_{location}$" values for Northern Pike in Wisconsin.
Figure 5:
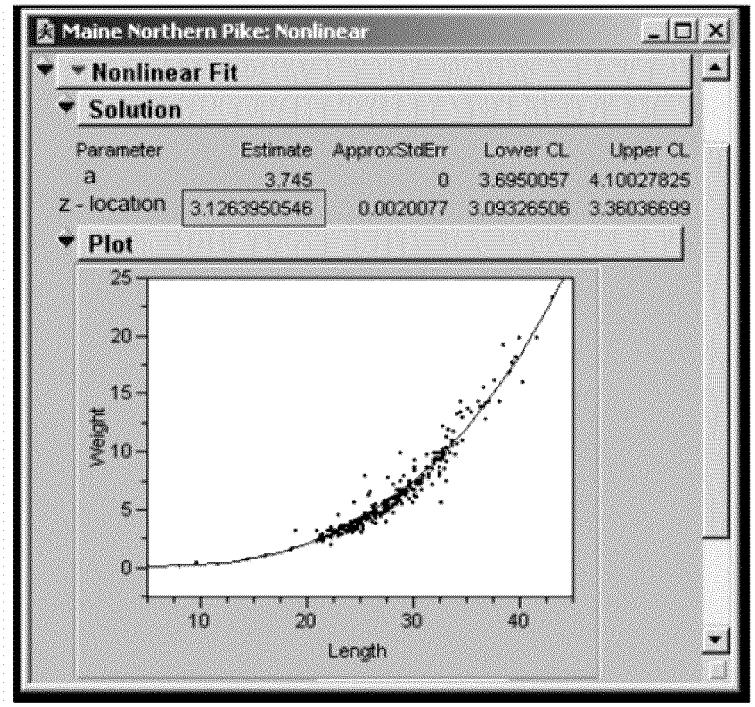
FIG. 5 shows an exemplary plot solved for "$Z_{location}$" values for Northern Pike in Maine.

To develop the location-dependent length/weight formulas, sets of length/weight pairs are collected and length-weight regression curves are plotted using a statistical software package. To do this, the variable "a" is held constant and an estimate/fit for the best value for "$Z$" for that combination of location and species is determined. FIGS. 4 and 5 show, by way of example, plots solved for "$Z_{location}$" values for Northern Pike in Wisconsin and Maine, respectively. As can be seen in FIGS. 4 and 5, the Wisconsin "$Z_{location}$" value is lower than the "$Z_{normal}$" value for Northern Pike while the Maine "$Z_{location}$" value is higher, indicating that Northern Pike are generally lighter for a given length in Wisconsin while they are generally heavier for the same length in Maine. As explained further below, the ratio "$Z_{location}$"/"$Z_{normal}$" is used to account for this regional variation.

The above equation relating weight, length, "a" and "$Z_{location}$" can also be used at steps 214, 314 of the methods 200, 300, respectively, to calculate, from the weight of a fish of a particular species caught in a particular location, a calculated length for that fish. In particular, the weight measurement (obtained at step 208 or 308) and the values for the variables "a" and "$Z_{location}$" are known, so the equation can be solved for length. This calculated length measurement can be used as alternative to, or in addition to, an actual length measurement for a given fish.

Taking account of the regional variations (i.e. location-dependent differences) in the length/weight relationship allows the scoring formulae to allocate more points to fish that are expected to be heavier and hence healthier. This accords with the "fishing common sense" that a heavier fish is better, and also accords with the fishing consequences of population density. One of the reasons fish of a particular species may be heavier in one region than in another is that the population is relatively not as dense in the first region. A low density population implies a smaller probability of catching a fish (of any size), which implies that it is more difficult to catch a "big one", such that a catch of that species should be accorded an increased point value.

In a preferred embodiment, the length/weight regression coefficients are reviewed annually, preferably in November or December, for species/location combinations where at least 100 new fish have been recorded in the past year (or fewer fish if there was previously little or no data for the specific species/location combination) to ensure the most recent locational length/weight data is reflected in the system. For locations where there is no length/weight data or not enough length/weight data, the $Z_{normal}$ values can be used as an approximation until the length/weight data is gathered. The annual review assists in ensuring that, for each species, locations with heavier fish for specific lengths will be rewarded with more points as these locations typically have healthier fish. The length/weight data may be data provided to the data processing system 110 via the first and second exemplary methods 200 and 300 described above, or may be collected, for example, from professional tournaments, through fisheries biologists and/or from government records to the extent each of the foregoing is available. In one implementation of the annual review and update of the relevant length/weight regression coefficients, for each species/location combination, a regression will be run based on the new data available and solved for the regression coefficient. For species/location combinations where there was no previous custom coefficient (i.e. where the $Z_{normal}$ value was used), the new regression coefficient value can be used. For species/location combinations where there is already an existing custom coefficient, a test for statistically significant error in the original regression coefficient will be conducted based on the size of the old and new data. If it is found that there is a statistical "error" in the existing coefficient (i.e. that the new data is outside of a desired confidence interval, e.g. 80% confidence, of what the old data would suggest), the coefficient will be adjusted to a point where the test would no longer suggest an error. As such, the old data and new data will be merged to create a new coefficient that gives credibility to both the old and new data. If it is found that the new data does not indicate an error in the existing coefficient, the new data will be kept and integrated into the existing data pool for consideration in the following year.

As noted above, in the preferred embodiment there are a plurality of different location-dependent, species-specific formulae, with each of the location-dependent, species-specific formulae corresponding to a respective length range. The demarcations between the different length ranges serve as benchmarks. In a particularly preferred embodiment, there are, for each species, three benchmark lengths separating four different location-dependent, species-specific formulae. In this embodiment, a first location-dependent, species-specific formula corresponds to lengths below an assigned large fish length value (also referred to as a "dynamic" length as explained further below), a second location-dependent, species-specific formula corresponds to lengths between the assigned large fish length value and an assigned huge fish length value, a third location-dependent, species-specific formula corresponds to lengths between the assigned huge fish length value and a record fish length value, and a fourth location-dependent, species-specific formula corresponds to lengths exceeding the record fish length value.

The record fish length value corresponds to the length of the recent record-setting largest fish of that species in the location to which the formula corresponds; thus, in the currently-described embodiment it will be the recent record-setting largest fish caught in the state or province to which the formula corresponds. The recent record-setting largest fish is the largest fish caught in the relevant location in a predetermined period preceding the present fishing season. As such, the recent record-setting largest fish may not be the absolute largest fish ever caught in that location; if the absolute largest fish was recorded too long ago it may not represent current conditions. Preferably, the record fish length value is set to the length of the largest fish of that species caught during the preceding 30 years in the location to which the formula corresponds although other recency periods may also be used (e.g. 10 years or 20 years). In a preferred embodiment, the state and provincial record fish lengths will be reviewed and updated to include new records on an annual basis, preferably in February to provide a consistent approach to point allocation over a season. Records that exceed the recency period (e.g. records that are 31 years old in the case of a 30 year recency period) can be flagged, and the data, length and weight for new records can be entered into the database. In cases where only a weight is recorded for a recent record-setting largest fish, the length can be a calculated length using the location-specific length-weight relationship; using the above standard length-weight relationship for a specific location would result in an inaccurate measure because the standard relationships do not take into account the regional variation in the length/weight relationship.

As will be explained further below, in the exemplary embodiment a fish whose length measurement is equal to the record fish length value for that species and location will be assigned a score of 1250 points. A fish whose length measurement exceeds the record fish length value for that species and location will be assigned a score above 1250 points, and a fish whose length measurement is less than the record fish length value for that species will receive a score below 1250 points. This is merely an exemplary embodiment, and other point values and point ranges may be used.

The huge fish length value corresponds generally (although not necessarily precisely) to the length of a "Master Angler" qualifying fish of that species in the relevant state or province. In a preferred embodiment, the huge fish length values will be reviewed on an annual basis, preferably in March to ensure that the most recent Master Angler information is captured for the upcoming season so as to provide a consistent approach to point allocation over a season. Similarly to the approach for the record fish length value, where only a weight is recorded for a "Master Angler" qualifying fish, the length can be approximated using the length-weight relationship. Other approaches to assigning the huge fish length value may also be used. For example, the huge fish length value may be determined as a percent (β) of the record fish of that species in that state or province based on information from the "Master Angler" programs. In one implementation, for a specific species, all states and provinces with a "Master Angler" program are grouped and the average value of the quotient obtained by dividing the "Master Angler" length value by the record length is used as the percent (β) by which the record fish length value for that state or province is multiplied to obtain the huge fish length value for that state or province. In the exemplary embodiment, as will be explained in more detail below, a fish whose length measurement is equal to the huge fish length value for that species and location will be assigned a score of 1000 points.

The large fish length value corresponds to a fish length that is considered large but attainable for a reasonably skilled angler. Thus, a "large" fish will represent a fish size that is challenging, but less difficult than a "huge" fish. In the exemplary embodiment, a fish whose length measurement is equal to the large fish length value for that species and location will be assigned a score of 500 points. As noted above, the large fish length value is also referred to as a "dynamic" length as it is intended to be periodically updated as new data is received to assist in ensuring that points are being allocated fairly across locations and species. For example, the large fish length value may be dynamically adjusted on an ongoing basis to ensure that a certain percentage (e.g. 30% or 40%) of fish submitted to the system will qualify as "large". In one embodiment, for each species and location an initial large fish length value may be set equal to a predetermined percentage (e.g. 50%) of the huge fish length value for that species and location. As data is gathered, at a certain point (e.g. 5000 catches system wide), the point distribution can be reviewed to determine what percentage of fish have been assigned a score of 500 points or higher, and this information can be used to determine a target percentage (i.e. the desired percentage of fish that will be assigned a score of 500 points or higher). Optionally, preliminary adjustments to the large fish length value can be made at this time. Periodically thereafter, e.g. annually or after every 100 fish of a given species in a given location have been recorded, the large fish length value can be adjusted so that after the revision, the percentage of fish assigned 500 points or higher corresponds to the target percentage. Thus, in a preferred embodiment, the data processing system 110 dynamically adjusts the large fish length value for each species in response to updated length data for that species. The frequency of refreshing the data can be selected as desired, for example in real time, once per month, once per season, once per year, and so on.

Figure 6:
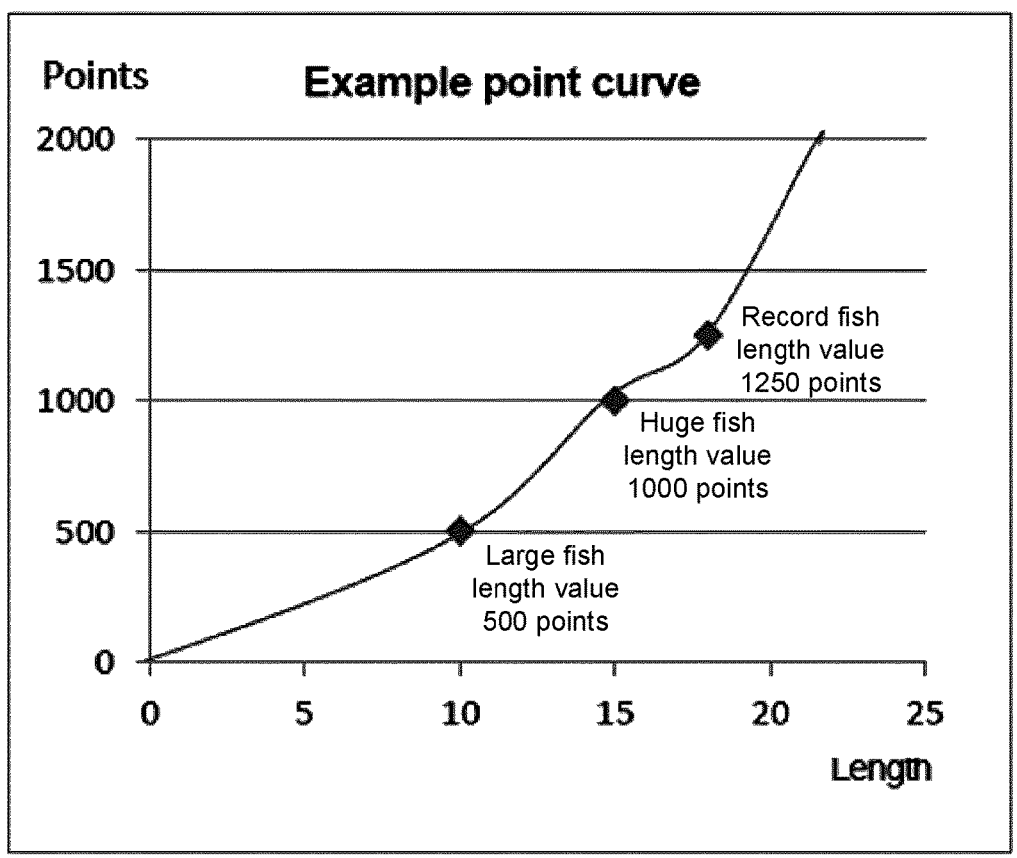
FIG. 6 shows an example point curve.

Thus, in the exemplary point system, 500 points corresponds to a large but reasonably attainable fish, 1000 points corresponds to a huge fish, based generally on widely understood "Master Angler" programs, and 1250 points corresponds to a recent record fish. FIG. 6 shows an example point curve with the positions of the large fish length value, huge fish length value and record fish length value indicated.

Figure 7:
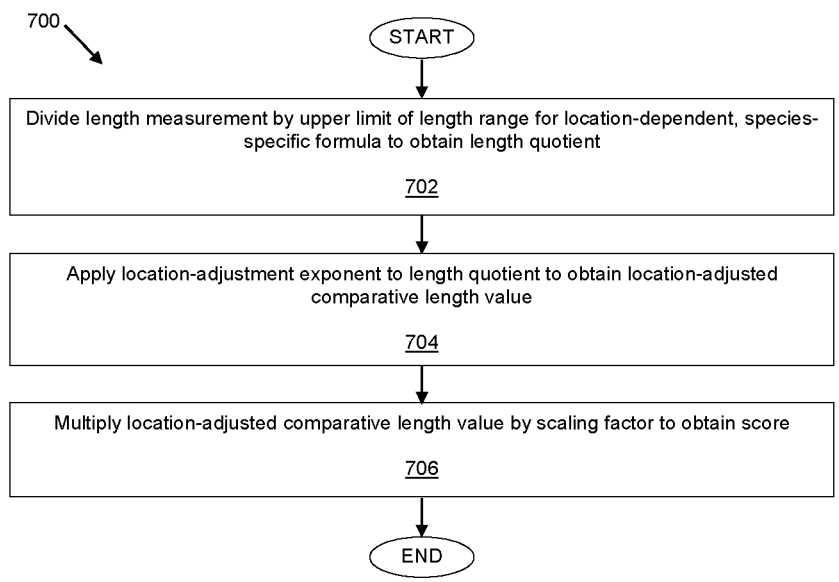
FIG. 7 is a flow chart showing an exemplary general method for applying location-dependent, species-specific formulae to length measurements.

FIG. 7 is a flow chart which shows a general method 700 for applying the location-dependent, species-specific formula to the length measurement (i.e. the method 700 may be carried out by the data processing system 110 as step 220 of the first exemplary method 200 or by the networked mobile wireless telecommunication computing device 106 as step 320 of the second exemplary method 300). It is to be appreciated that the length measurement to which the location-dependent, species-specific formula is applied in the method 700 may be an actual length measurement or a calculated length measurement calculated from a weight measurement. At step 702, the length measurement is divided by the upper limit of the length range for that location-dependent, species-specific formula to obtain a length quotient. At step 704 a location-adjustment exponent is applied to the length quotient to obtain a location-adjusted comparative length value; the location-adjustment exponent adjusts for regional weight variations. Preferably, the value of the location-adjustment exponent is dependent on the applied location-dependent, species-specific formula; i.e. for a given species at least some of the first, second, third and fourth location-dependent, species-specific formulae will have different location adjustment exponents. At step 706, the location-adjusted comparative length value is multiplied by a scaling factor to obtain the score. In a preferred embodiment, the value of the scaling factor is dependent on the applied location-dependent, species-specific formula; i.e. for a given species at least some of the first, second, third and fourth location-dependent, species-specific formulae will have different scaling factors.

For the exemplary embodiment, the first location-dependent, species-specific formula, which corresponds to lengths below the large fish length value, is shown below:

$$\text{Points} = \left[\frac{\text{Length measurement}}{\text{Large fish length value}}\right]^{Z_{normal}/Y_{location}} \times 500$$

where $Y_{location} = Z_{location}/Z_{normal}$.

In the above formula, the location adjustment exponent is $[Z_{normal}/Y_{location}]$ and the scaling factor is 500. Note that $Y_{location} < 1$ if the fish in the relevant location are lighter than normal and $Y_{location} > 1$ if the fish in the relevant location are heavier than normal. Since the value of the length quotient [length measurement/large fish length value]≤1 (the above formula corresponds to lengths below the large fish length value), the value of $Y_{location}$ will assign a higher score to fish caught in a location where the fish of that species are generally heavier and will assign a lower score to fish caught in a location where the fish of that species are generally lighter. Notably, in the above exemplary formula, and in the formulae set out below, the value of $Y_{location}$ accounts for the expected weights of the fish in that location; the actual weights of the caught fish are not used directly in the formulae.

For the exemplary embodiment, the second location-dependent, species-specific formula, which corresponds to lengths between the large fish length value and the assigned huge fish length value, is shown below:

$$\text{Points} = \left[\frac{\text{Length measurement}}{\text{Huge fish length value}}\right]^{X/Y_{location}} \times 1000$$

in which the scaling factor is 1000 and the value of X in the location adjustment exponent $[X/Y_{location}]$ is the value obtained by solving the following equation for X:

$$500 = \left[\frac{\text{Large fish length value}}{\text{Huge fish length value}}\right]^{X} \times 1000$$

Again, if the fish in the relevant location are lighter than normal, $Y_{location} < 1$ and if the fish in the relevant location are heavier than normal, $Y_{location} > 1$ will result in a higher score for fish caught in a location where the fish of that species are generally heavier and a lower score for fish caught in a location where the fish of that species are generally lighter (since the value of the length quotient [length measurement/huge fish length value]≤1 because the above formula corresponds to lengths below the huge fish length value).

For the exemplary embodiment, the third location-dependent, species-specific formula, which corresponds to lengths between the assigned huge fish length value and the record fish length value, is shown below:

$$\text{Points} = \left[\frac{\text{Length measurement}}{\text{Record fish length value}}\right]^{W/Y_{location}} \times 1250$$

in which the scaling factor is 1250 and the value of W in the location adjustment exponent $[W/Y_{location}]$ is the value obtained by solving the following equation for W:

$$500 = \left[\frac{\text{Large fish length value}}{\text{Record fish length value}}\right]^{W} \times 1250$$

As with the first and second location-dependent, species-specific formulae, in the third location-dependent, species-specific formula $Y_{location} < 1$ if the fish in the relevant location are lighter than normal and $Y_{location} > 1$ if the fish in the relevant location are heavier than normal. Because the length quotient [length measurement/record fish length value]≤1 (since the above formula corresponds to lengths below the record fish length value), a higher score is assigned to fish caught in a location where the fish of that species are generally heavier and a lower score is assigned to fish caught in a location where the fish of that species are generally lighter.

In one embodiment, specialized, simplified formulae may be provided for the cases where the length measurement is equal to the large fish length value, the huge fish length value or the record fish length value. These specialized formulae could state simply that if the length measurement is equal to the large fish length value, that fish is assigned a score of 500 points, if the length measurement is equal to the huge fish length value, that fish is assigned a score of 1000 points, and if the length measurement is equal to the record fish length value, that fish is assigned a score of 1250 points. However, this same result would obtain if the first, second and third location-dependent, species-specific formulae were extended to correspond not only to length measurements between their lower and upper bounds but also to include length measurements equal to their upper bounds.

For example, where the first location-dependent, species-specific formula further corresponds to lengths equal to the large fish length value, if the measured length is equal to the large fish length value, the length quotient [length measurement/large fish length value] will be 1, which is unaffected by application of the location adjustment exponent, resulting in a point value of 500. Similarly, where the second location-dependent, species-specific formula further corresponds to lengths equal to the huge fish length value, if the measured length is equal to the huge fish length value, the length quotient [length measurement/huge fish length value] will be 1, again unaffected by application of the location adjustment exponent, resulting in a point value of 1000. Likewise, if the third location-dependent, species-specific formula further corresponds to lengths equal to the record fish length value, if the measured length is equal to the record fish length value, the length quotient [length measurement/record fish length value] will be 1, which is once again unaffected by application of the location adjustment exponent, resulting in a point value of 1250.

For the exemplary embodiment, the fourth location-dependent, species-specific formula, which corresponds to lengths exceeding the record fish length value, is shown below:

$$\text{Points} = \left[\frac{\text{Length measurement}}{\text{Record fish length value}}\right]^{Z_{normal} \times Y_{location}} \times 1250$$

The fourth location-dependent, species-specific formula may be seen as an exception to the general method 700 for applying the location-dependent, species-specific formulae to the length measurement for which, at step 702, the length measurement is divided by the upper limit of the length range for that location-dependent, species-specific formula to obtain a length quotient. This is because the length range for the fourth location-dependent, species-specific formula does not have an upper limit, but only a lower limit, namely the record fish length value. In this case, the length quotient is obtained by dividing the length measurement by the lower limit of the length range (the record fish length value). $Y_{location}$ is multiplied by $Z_{normal}$ to obtain the location adjustment exponent and since $Y_{location}<1$ if the fish in the relevant location are lighter than normal and $Y_{location}>1$ if the fish in the relevant location are heavier than normal, and since the length quotient [length measurement/record fish length value]>1 (as the above formula applies where the measured length exceeds the record fish length value), higher values of $Y_{location}$ result in higher scores. Thus, once again a higher score is assigned to fish caught in a location where the fish of that species are generally heavier and a lower score is assigned to fish caught in a location where the fish of that species are generally lighter.

The scores obtained in the manner described above can be used for comparison and for ranking of anglers. For example, the data processing system 110 may, for a given type of fish, use the scores to rank anglers, with a higher score corresponding to a higher rank. Because the scores accommodate regional variations, the ranking may be a national ranking or an international ranking (e.g. a North American ranking), or may be a ranking within a virtual tournament including participants in different locations, for example in different states and provinces. Alternatively, the ranking may be personalized for individual users, for example showing how an individual ranks relative to the individual's friends or online contacts.

The present technology may be embodied within a system, a method, a computer program product or any combination thereof. The computer program product may include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

Aspects of the present technology have been described above with reference to flowchart illustrations and/or block diagrams of methods, apparatus (systems) and computer program products according to various embodiments. In this regard, the flowchart and block diagrams in the Figures illustrate the architecture, functionality, and operation of possible implementations of systems, methods and computer program products according to various embodiments of the present technology. For instance, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some specific examples of the foregoing may have been noted above but any such noted examples are not necessarily the only such examples. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
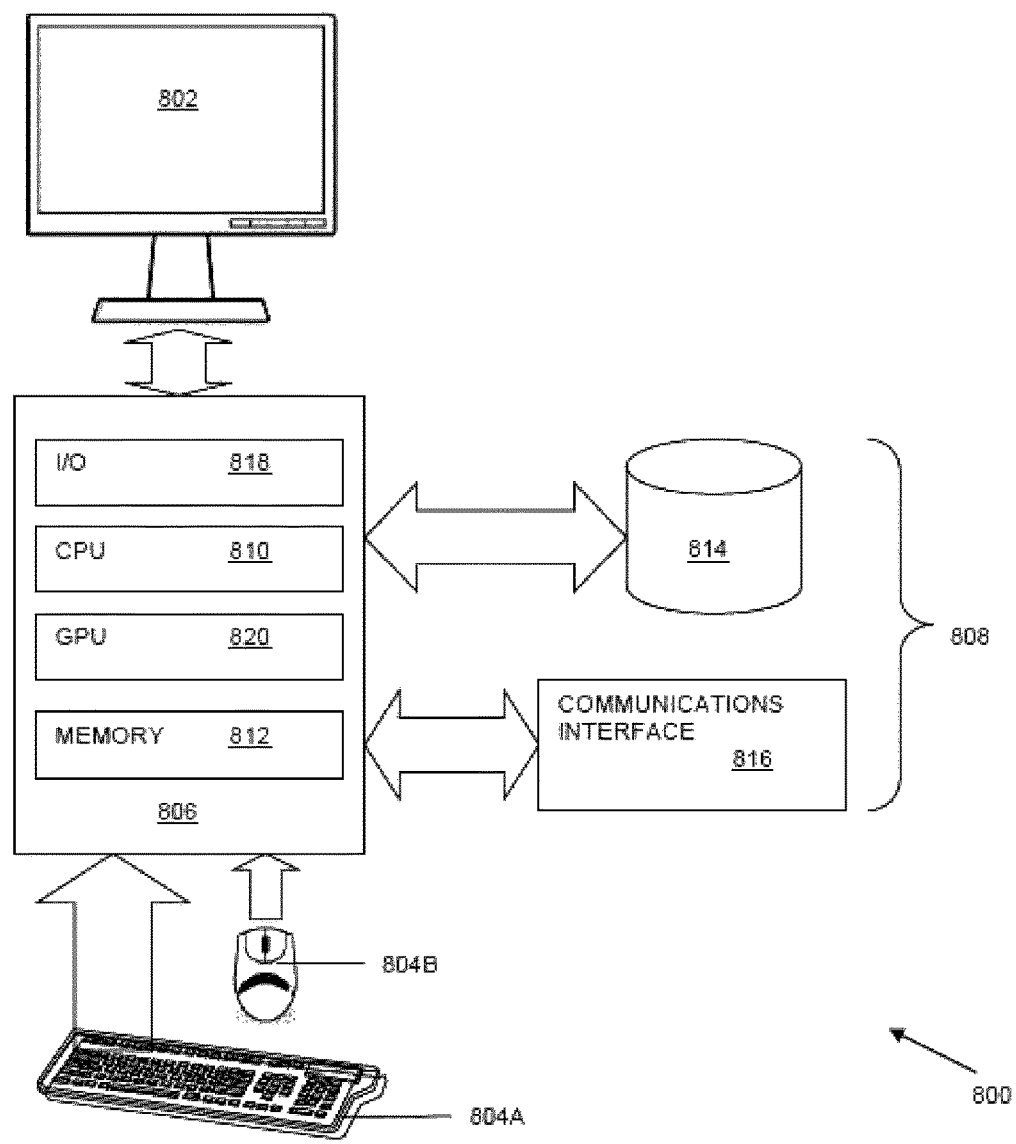
FIG. 8 is a block diagram showing an illustrative computer system in respect of which aspects of the technology herein described may be implemented.

An illustrative computer system in respect of which the technology herein described may be implemented is presented as a block diagram in FIG. 8. The illustrative computer system is denoted generally by reference numeral 800 and includes a display 802, input devices in the form of keyboard 804A and pointing device 804B, computer 806 and external devices 808. While pointing device 804B is depicted as a mouse, it will be appreciated that other types of pointing device may also be used.

The computer 806 may contain one or more processors or microprocessors, such as a central processing unit (CPU) 810. The CPU 810 performs arithmetic calculations and control functions to execute software stored in an internal memory 812, preferably random access memory (RAM) and/or read only memory (ROM), and possibly additional memory 814. The additional memory 814 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 814 may be physically internal to the computer 806, or external as shown in FIG. 8, or both.

The computer system 800 may also include other similar means for allowing computer programs or other instructions to be loaded. Such means can include, for example, a communications interface 816 which allows software and data to be transferred between the computer system 800 and external systems and networks. Examples of communications interface 816 can include a modem, a network interface such as an Ethernet card, a wireless communication interface, or a serial or parallel communications port. Software and data transferred via communications interface 816 are in the form of signals which can be electronic, acoustic, electromagnetic, optical or other signals capable of being received by communications interface 816. Multiple interfaces, of course, can be provided on a single computer system 800.

Input and output to and from the computer 806 is administered by the input/output (I/O) interface 818. This I/O interface 818 administers control of the display 802, keyboard 804A, external devices 808 and other such components of the computer system 800. The computer 806 also includes a graphical processing unit (GPU) 820. The latter may also be used for computational purposes as an adjunct to, or instead of, the (CPU) 810, for mathematical calculations.

The various components of the computer system 800 are coupled to one another either directly or by coupling to suitable buses.

Figure 9:
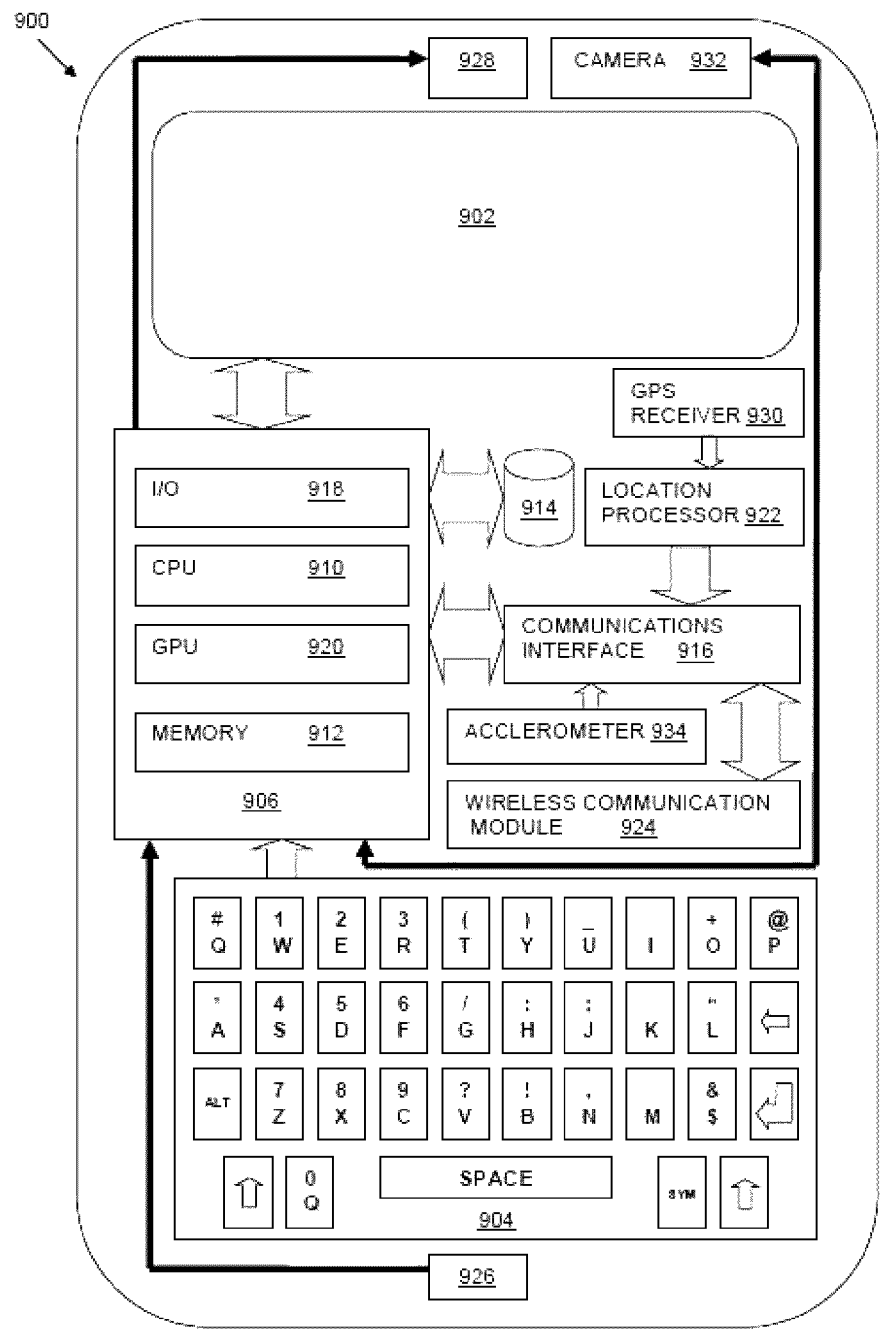
FIG. 9 is a block diagram showing an illustrative networked mobile wireless telecommunication computing device in respect of which aspects of the technology herein described may be implemented.

FIG. 9 shows an exemplary networked mobile wireless telecommunication computing device in the form of a smartphone 900. The smartphone 900 includes a display 902, an input device in the form of keyboard 904 and an onboard computer system 906. The display 902 may be a touchscreen display and thereby serve as an additional input device, or as an alternative to the keyboard 904. The onboard computer system 906 comprises a central processing unit (CPU) 910 having one or more processors or microprocessors for performing arithmetic calculations and control functions to execute software stored in an internal memory 912, preferably random access memory (RAM) and/or read only memory (ROM) is coupled to additional memory 914 which will typically comprise flash memory, which may be integrated into the smartphone 900 or may comprise a removable flash card, or both. The smartphone 900 also includes a communications interface 916 which allows software and data to be transferred between the smartphone 900 and external systems and networks. The communications interface 916 is coupled to one or more wireless communication modules 924, which will typically comprise a wireless radio for connecting to one or more of a cellular network, a wireless digital network or a Wi-Fi network. The communications interface 916 will also typically enable a wired connection of the smartphone 900 to an external computer system. A microphone 926 and speaker 928 are coupled to the onboard computer system 906 to support the telephone functions managed by the onboard computer system 906, and a location processor 922 is also coupled to the communications interface 916 to support navigation operations by the onboard computer system 906, including determination of the present geographic position of the smartphone 900. The location processor will typically be coupled to GPS receiver hardware 930, and may also be coupled to other systems to facilitate location processing, for example by way of cellular triangulation or beacon triangulation. An imaging system in the form of a camera 932 is also coupled to the onboard computer system 906, as is an accelerometer and/or motion sensor 934. Input and output to and from the onboard computer system 906 is administered by the input/output (I/O) interface 918, which administers control of the display 902, keyboard 904, microphone 926 and speaker 928. The onboard computer system 906 may also include a separate graphical processing unit (GPU) 920. The various components are coupled to one another either directly or by coupling to suitable buses.

The term "computer system" and related terms, as used herein, is not limited to any particular type of computer system and encompasses servers, desktop computers, laptop computers, networked mobile wireless telecommunication computing devices such as smartphones, tablet computers, as well as other types of computer systems.

Thus, computer readable program code for implementing aspects of the technology described herein may be contained or stored in the memory 912 of the onboard computer system 906 of the smartphone 900 or the memory 812 of the computer 806, or on a computer usable or computer readable medium external to the onboard computer system 906 of the smartphone 900 or the computer 806, or on any combination thereof.

Finally, the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope of the claims. The embodiment was chosen and described in order to best explain the principles of the technology and the practical application, and to enable others of ordinary skill in the art to understand the technology for various embodiments with various modifications as are suited to the particular use contemplated.

Certain embodiments have been described by way of example. It will be apparent to persons skilled in the art that a number of variations and modifications can be made without departing from the scope of the claims. In construing the claims, it is to be understood that the use of a computer to implement the embodiments described herein, including without limitation determination of the catch location by a location processor of a networked mobile wireless telecommunication computing device, is essential.

What is claimed is:

1. A computer-implemented method for scoring a fish for comparative ranking, the method comprising:
   receiving, at a data processing system, a catch location where the fish was caught;
   the catch location determined by a location processor of a networked mobile wireless telecommunication computing device that communicates with the data processing system;
   the networked mobile wireless telecommunication computing device being geographically remote from the data processing system;
   obtaining, at the data processing system, a species identification for the fish;
   obtaining, at the data processing system, a first length measurement for the fish, the first length measurement being a calculated length measurement calculated from a weight measurement for the fish;
   the data processing system using the catch location and the species identification to apply a first applied location-dependent, species-specific formula to the first length measurement to assign a first location-adjusted score to the fish;
   the first location-adjusted score being different from the first length measurement;
   obtaining, at the data processing system, a second length measurement for the fish;
   the second length measurement being an actual length measurement;
   the data processing system using the catch location and the species identification to apply a second applied location-dependent, species-specific formula to the second length measurement to assign a second location-adjusted score to the fish;
   wherein the second location-adjusted score is different from the second length measurement; and
   the data processing system assigning the greater of the first location-adjusted score and the second location-adjusted score to the fish as a final score;
   wherein the first applied location-dependent, species-specific formula and the second applied location-dependent, species-specific formula are identical.

2. The method of claim 1, wherein:
   the data processing system selects the first applied location-dependent, species-specific formula from a plurality of different location-dependent, species-specific formulae;
   each of the plurality of different location-dependent, species-specific formulae corresponding to a respective length range; and
   the data processing system selects, as the first applied location-dependent, species-specific formula, one of the plurality of different location-dependent, species-specific formulae corresponding to the length range that encompasses the first length measurement.

3. The method of claim 2, wherein for each species, the plurality of different location-dependent, species-specific formulae comprises:
   a first location-dependent, species-specific formula corresponding to lengths below an assigned large fish length value;
   a second location-dependent, species-specific formula corresponding to lengths between the assigned large fish length value and an assigned huge fish length value;
   a third location-dependent, species-specific formula corresponding to lengths between the assigned huge fish length value and a record fish length value; and
   a fourth location-dependent, species-specific formula corresponding to lengths exceeding the record fish length value.

4. The method of claim 3, wherein:
   the first location-dependent, species-specific formula further corresponds to lengths equal to the assigned large fish length value;
   the second location-dependent, species-specific formula further corresponds to lengths equal to the assigned huge fish length value; and
   the third location-dependent, species-specific formula further corresponds to lengths equal to the record fish length value.

5. The method of claim 3, wherein the data processing system dynamically adjusts the assigned large fish length value for each species in response to updated length data for that species.

6. The method of claim 2, wherein the data processing system applies the first applied location-dependent, species-specific formula to the first length measurement by:
dividing the first length measurement by an upper limit of the length range for the first location-dependent, species-specific formula to obtain a length quotient; and
applying a location-adjustment exponent to the length quotient to obtain a location-adjusted comparative length value.

7. The method of claim 6, wherein the data processing system further multiplies the location-adjusted comparative length value by a scaling factor to obtain the first location-adjusted score.

8. The method of claim 7, wherein the value of the scaling factor is dependent on the first applied location-dependent, species-specific formula.

9. The method of claim 6, wherein the location-adjustment exponent adjusts for regional weight variations.

10. The method of claim 6, wherein the value of the location-adjustment exponent is dependent on the first applied location-dependent, species-specific formula.

11. The method of claim 1, wherein the data processing system obtains the first length measurement from the networked mobile wireless telecommunication computing device.

12. A computer-implemented method for scoring a fish for comparative ranking, the method comprising:
determining, by a location processor of a networked mobile wireless telecommunication computing device, a catch location where the fish was caught;
obtaining, at the networked mobile wireless telecommunication computing device, a species identification for the fish;
obtaining, at the networked mobile wireless telecommunication computing device, a first length measurement for the fish, the first length measurement being a calculated length measurement calculated from a weight measurement for the fish; and
the networked mobile wireless telecommunication computing device using the catch location and the species identification to apply a first applied location-dependent, species-specific formula to the first length measurement to assign a first location-adjusted score to the fish;
the first location-adjusted score being different from the first length measurement;
obtaining, at the networked mobile wireless telecommunication computing device, a second length measurement for the fish;
the second length measurement being an actual length measurement;
the networked mobile wireless telecommunication computing device using the catch location and the species identification to apply a second applied location-dependent, species-specific formula to the second length measurement to assign a second location-adjusted score to the fish;
wherein the second location-adjusted score is different from the second length measurement; and
the networked mobile wireless telecommunication computing device assigning the greater of the first location-adjusted score and the second location-adjusted score to the fish as a final score.

13. The method of claim 12, wherein the first applied location-dependent, species-specific formula and the second applied location-dependent, species-specific formula are identical.

14. The method of claim 12, wherein the first applied location-dependent, species-specific formula and the second applied location-dependent, species-specific formula are different.

15. The method of claim 12, further comprising the networked mobile wireless telecommunication computing device transmitting the first location-adjusted score to a data processing system that is geographically remote from the networked mobile wireless telecommunication computing device.

16. The method of claim 12, wherein:
the networked mobile wireless telecommunication computing device selects the first applied location-dependent, species-specific formula from a plurality of different location-dependent, species-specific formulae;
each of the plurality of different location-dependent, species-specific formulae corresponding to a respective length range; and
the networked mobile wireless telecommunication computing device selects, as the first applied location-dependent, species-specific formula, one of the plurality of different location-dependent, species-specific formulae corresponding to the length range that encompasses the first length measurement.

17. The method of claim 16, wherein for each species, the plurality of different location-dependent, species-specific formulae comprises:
a first location-dependent, species-specific formula corresponding to lengths below an assigned large fish length value;
a second location-dependent, species-specific formula corresponding to lengths between the assigned large fish length value and an assigned huge fish length value;
a third location-dependent, species-specific formula corresponding to lengths between the assigned huge fish length value and a record fish length value; and
a fourth location-dependent, species-specific formula corresponding to lengths exceeding the record fish length value.

18. The method of claim 17, wherein:
the first location-dependent, species-specific formula further corresponds to lengths equal to the assigned large fish length value;
the second location-dependent, species-specific formula further corresponds to lengths equal to the assigned huge fish length value; and
the third location-dependent, species-specific formula further corresponds to lengths equal to the record fish length value.

19. The method of claim 17, wherein the networked mobile wireless telecommunication computing device dynamically adjusts the assigned large fish length value for each species in response to updated length data for that species.

20. The method of claim 16, wherein the networked mobile wireless telecommunication computing device applies the first applied location-dependent, species-specific formula to the first length measurement by:
dividing the first length measurement by an upper limit of the length range for the first location-dependent, species-specific formula to obtain a length quotient; and
applying a location-adjustment exponent to the length quotient to obtain a location-adjusted comparative length value.

21. The method of claim 20, wherein the networked mobile wireless telecommunication computing device further multiplies the location-adjusted comparative length value by a scaling factor to obtain the first location-adjusted score.

22. The method of claim 21, wherein the value of the scaling factor is dependent on the first applied location-dependent, species-specific formula.

23. The method of claim 20, wherein the location-adjustment exponent adjusts for regional weight variations.

24. The method of claim 20, the value of the location-adjustment exponent is dependent on the first applied location-dependent, species-specific formula.

25. The method of claim 12, wherein said obtaining, at the networked mobile wireless telecommunication computing device, the first length measurement for the fish comprises:
- the networked mobile wireless telecommunication computing device obtaining an image of the fish; and
- the networked mobile wireless telecommunication computing device using the image of the fish to obtain the first length measurement.

* * * * *